(12) United States Patent
Jiang et al.

(10) Patent No.: US 10,250,289 B2
(45) Date of Patent: Apr. 2, 2019

(54) ELECTRONIC DEVICE ANTENNAS WITH GROUND ISOLATION

(71) Applicant: Apple Inc., Cupertino, CA (US)

(72) Inventors: Yi Jiang, Cupertino, CA (US); Jiangfeng Wu, Santa Clara, CA (US); Lijun Zhang, San Jose, CA (US); Siwen Yong, Santa Clara, CA (US); Jiaxiao Niu, Shanghai (CN); Mattia Pascolini, San Francisco, CA (US); Jayesh Nath, Milpitas, CA (US); Carlo Di Nallo, San Carlos, CA (US); Zheyu Wang, Sunnyvale, CA (US); Mario Martinis, Cupertino, CA (US); Eduardo Jorge Da Costa Bras Lima, Sunnyvale, CA (US); Steven P. Cardinali, Campbell, CA (US); Rex Tyler Ehman, Santa Clara, CA (US); James G. Horiuchi, Fremont, CA (US); Trevor J. Ness, Palo Alto, CA (US); Scott D. Morrison, Santa Cruz, CA (US); Siddharth Nangia, San Francisco, CA (US); Mushtaq A. Sarwar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 15/257,521

(22) Filed: Sep. 6, 2016

(65) Prior Publication Data

US 2018/0069588 A1  Mar. 8, 2018

(51) Int. Cl.
*G06F 1/16* (2006.01)
*H01Q 9/30* (2006.01)
(Continued)

(52) U.S. Cl.
CPC ............... *H04B 1/40* (2013.01); *G06F 1/163* (2013.01); *G06F 1/1626* (2013.01);
(Continued)

(58) Field of Classification Search
CPC ....... H04B 1/40; G06F 1/1613; H04M 1/0202
See application file for complete search history.

(56) References Cited

U.S. PATENT DOCUMENTS 8,648,752 B2   2/2014 Ramachandran et al.
8,791,864 B2 * 7/2014 Merz .................. H01Q 1/243
                                                  343/702

(Continued)

*Primary Examiner* — Nguyen T Vo
(74) *Attorney, Agent, or Firm* — Treyz Law Group, P.C.; G. Victor Treyz

(57) ABSTRACT

An electronic device may have a display cover layer mounted to a metal housing. Electrical component layers such as a display layer, touch sensor layer, and near-field communications antenna layer may be mounted under the display cover layer. An antenna feed may have a positive feed terminal coupled to the electrical component layers and a ground feed terminal coupled to the metal housing. The electrical component layers may serve as an antenna resonating element for an antenna. The antenna may cover cellular telephone bands and may receive satellite navigation system signals. A system-in-package device may be mounted to the metal housing. A flexible printed circuit may extend between the electrical component layers and the system-in-package device. A mounting bracket for the system-in-package device may be provided with electrical isolation to enhance antenna performance in bands such as a satellite navigation system band.

20 Claims, 8 Drawing Sheets

(51) Int. Cl.
*H04B 1/40* (2015.01)
*H04M 1/02* (2006.01)
*H04B 1/3888* (2015.01)

(52) U.S. Cl.
CPC .......... *G06F 1/1637* (2013.01); *G06F 1/1658* (2013.01); *G06F 1/1698* (2013.01); *H04B 1/3888* (2013.01); *H04M 1/0202* (2013.01); *H01Q 9/30* (2013.01)

(56) References Cited

U.S. PATENT DOCUMENTS

| | | | |
|---|---|---|---|
| 9,379,491 B2 | 6/2016 | Lee | |
| 9,413,080 B2 | 8/2016 | Park et al. | |
| 2008/0316116 A1* | 12/2008 | Hobson | H01Q 1/243 343/702 |
| 2013/0147676 A1 | 6/2013 | Chang et al. | |
| 2013/0321216 A1* | 12/2013 | Jervis | G06F 1/1616 343/702 |
| 2015/0130667 A1 | 5/2015 | Koskiniemi et al. | |

\* cited by examiner

ELECTRONIC DEVICE ANTENNAS WITH GROUND ISOLATION

BACKGROUND

This relates to electronic devices, and more particularly, to electronic devices with wireless communications circuitry.

Electronic devices are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device may have a display cover layer mounted to a metal housing. Electrical component layers such as a display layer, touch sensor layer, and near-field communications antenna layer may be mounted under the display cover layer. An antenna feed may have a positive feed terminal coupled to the electrical component layers and a ground feed terminal coupled to the metal housing. The electrical component layers may serve as an antenna resonating element for an antenna. The antenna may cover cellular telephone bands and may receive satellite navigation system signals such as Global Positioning System signals. A system-in-package device may be mounted to the metal housing. A flexible printed circuit that extends between the electrical component layers and the system-in-package device may form part of the antenna and may carries signals for the electrical component layers.

The system-in-package device may have a metal trace that forms a ground plane. The ground plane may be shorted to one or more grounding solder pads on the system-in-package device. Mounting brackets be coupled between the grounding solder pads and the metal housing. To enhance antenna performance in bands such as a satellite navigation system band, the mounting scheme associated with at least one of the mounting brackets may form an open circuit between the system-in-package ground plane and the metal housing.

With one arrangement, one end of a bracket member may be coated with plastic. With another illustrative arrangement, a tank circuit may be interposed between a grounding solder pad in the system-in-package device and the system-in-package ground plane. A horseshoe-shaped grounding pad arrangement and mesh-shaped ground plane traces may also be used. In some configurations, dielectric gaskets, insulating layers of adhesive, or other insulating structures may be interposed in the bracket path between the system-in-package device and metal housing. These arrangements may create a capacitance between the ground plane in the system-in-package device and the metal housing at one of the mounting brackets while other mounting brackets form part of a direct grounding path that shorts the system-in-package ground plane to the metal housing without this capacitance.

DETAILED DESCRIPTION

Figure 1:
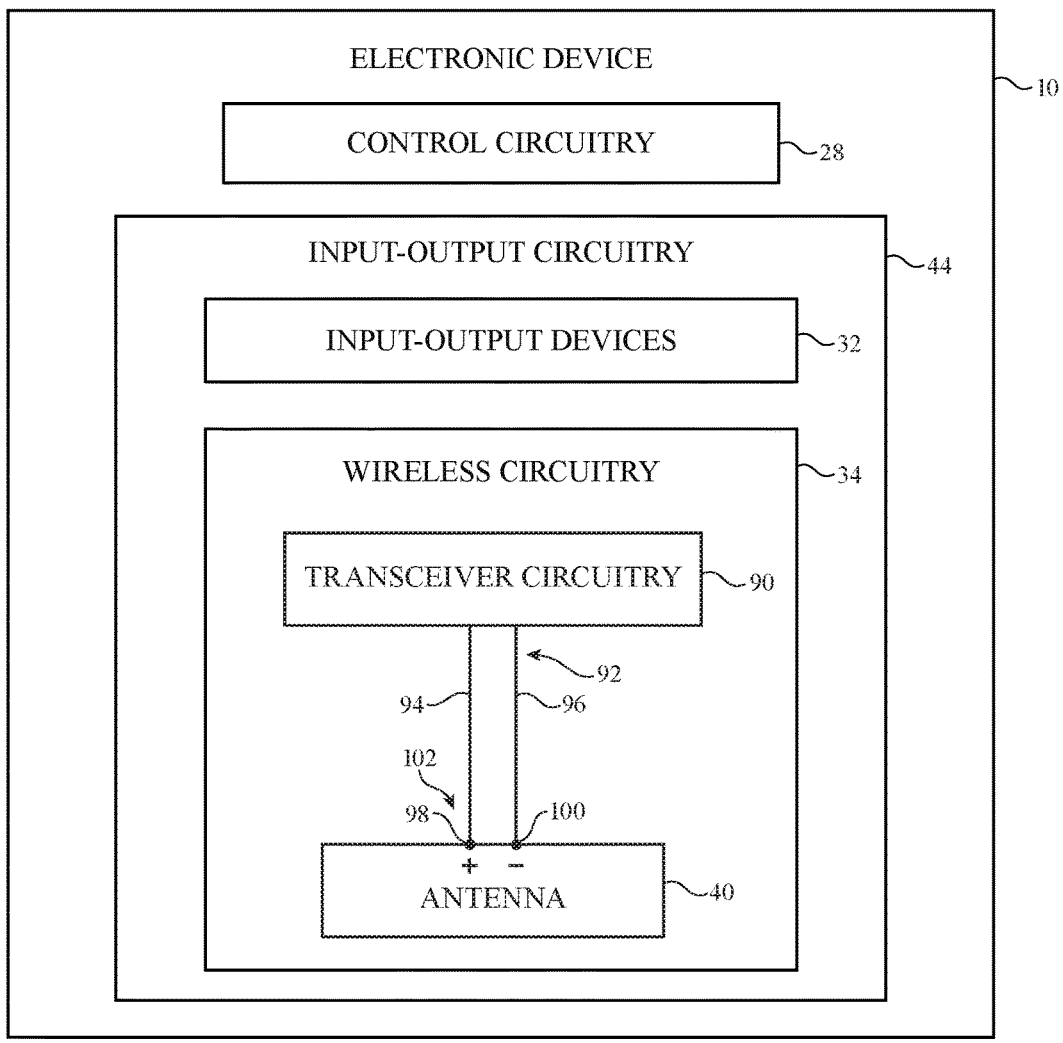
FIG. 1 is a schematic diagram of an illustrative electronic device in accordance with an embodiment.

An electronic device such as electronic device 10 of FIG. 1 may be provided with wireless circuitry. The wireless circuitry may include antennas such as cellular telephone antennas, wireless local area network antennas, satellite navigation system antennas, and other antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may include storage and processing circuitry such as control circuitry 28. Circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 28 may be used to control the operation of device 10. This processing circuitry may be based on one or more microprocessors, microcontrollers, digital signal processors, application specific integrated circuits, etc.

Circuitry 28 may be used to run software on device 10, such as internet browsing applications, voice-over-internet-protocol (VOIP) telephone call applications, email applications, media playback applications, operating system functions, etc. To support interactions with external equipment, circuitry 28 may be used in implementing communications protocols. Communications protocols that may be implemented using circuitry 28 include internet protocols, wireless local area network protocols (e.g., IEEE 802.11 protocols—sometimes referred to as WiFi®—and protocols for other short-range wireless communications links such as the Bluetooth® protocol), cellular telephone protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34. To support wireless communications, wireless circuitry 34 may include radio-frequency (RF) transceiver circuitry 90 formed from one or more integrated circuits, power amplifier circuitry, low-noise input amplifiers, passive RF components, one or more antennas such as antenna 40, transmission lines such as transmission line 92, and other circuitry for handling RF wireless signals. Wireless signals can also be sent using light (e.g., using infrared communications).

Radio-frequency transceiver circuitry 90 may include wireless local area network transceiver circuitry to handle 2.4 GHz and 5 GHz bands for WiFi® (IEEE 802.11) communications and may include Bluetooth® circuitry to handle the 2.4 GHz Bluetooth® communications band. Circuitry 90 may include cellular telephone transceiver circuitry to handle wireless communications in frequency ranges such as a low communications band from 700 to 960 MHz, a midband from 1400 MHz or 1500 MHz to 2170 MHz (e.g., a midband with a peak at 1700 MHz), and a high band from 2170 or 2300 to 2700 MHz (e.g., a high band with a peak at 2400 MHz) or other communications bands between 700 MHz and 2700 MHz or other suitable frequencies (e.g., frequencies above 2700 MHz). Circuitry 90 may include satellite navigation system circuitry such as global positioning system (GPS) receiver circuitry for receiving GPS signals at 1575 MHz or for handling other satellite positioning data. If desired, circuitry 90 can include circuitry for other short-range and long-range wireless links if desired. For example, circuitry 90 may include 60 GHz transceiver circuitry or other circuitry for handling millimeter wave communications, may include circuitry for receiving television and radio signals, may include near field communications (NFC) transceiver circuitry (e.g., an NFC transceiver operating at 13.56 MHz or other suitable frequency), etc.

Wireless circuitry 34 may include one or more antennas such as antenna 40. Antennas such as antenna 40 may be formed using any suitable antenna types. For example, antennas in device 10 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for transceiver circuitry 90.

As shown in FIG. 1, radio-frequency transceiver circuitry 90 may be coupled to antenna feed 102 of antenna 40 using transmission line 92. Antenna feed 102 may include a positive antenna feed terminal such as positive antenna feed terminal 98 and may have a ground antenna feed terminal such as ground antenna feed terminal 100. Transmission line 92 may be formed form metal traces on a printed circuit or other conductive structures and may have a positive transmission line signal path such as path 94 that is coupled to terminal 98 and a ground transmission line signal path such as path 96 that is coupled to terminal 100. Transmission line paths such as path 92 may be used to route antenna signals within device 10. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission lines such as transmission line 92 and/or circuits such as these may be incorporated into antenna 40 (e.g., to support antenna tuning, to support operation in desired frequency bands, etc.).

Figure 2:
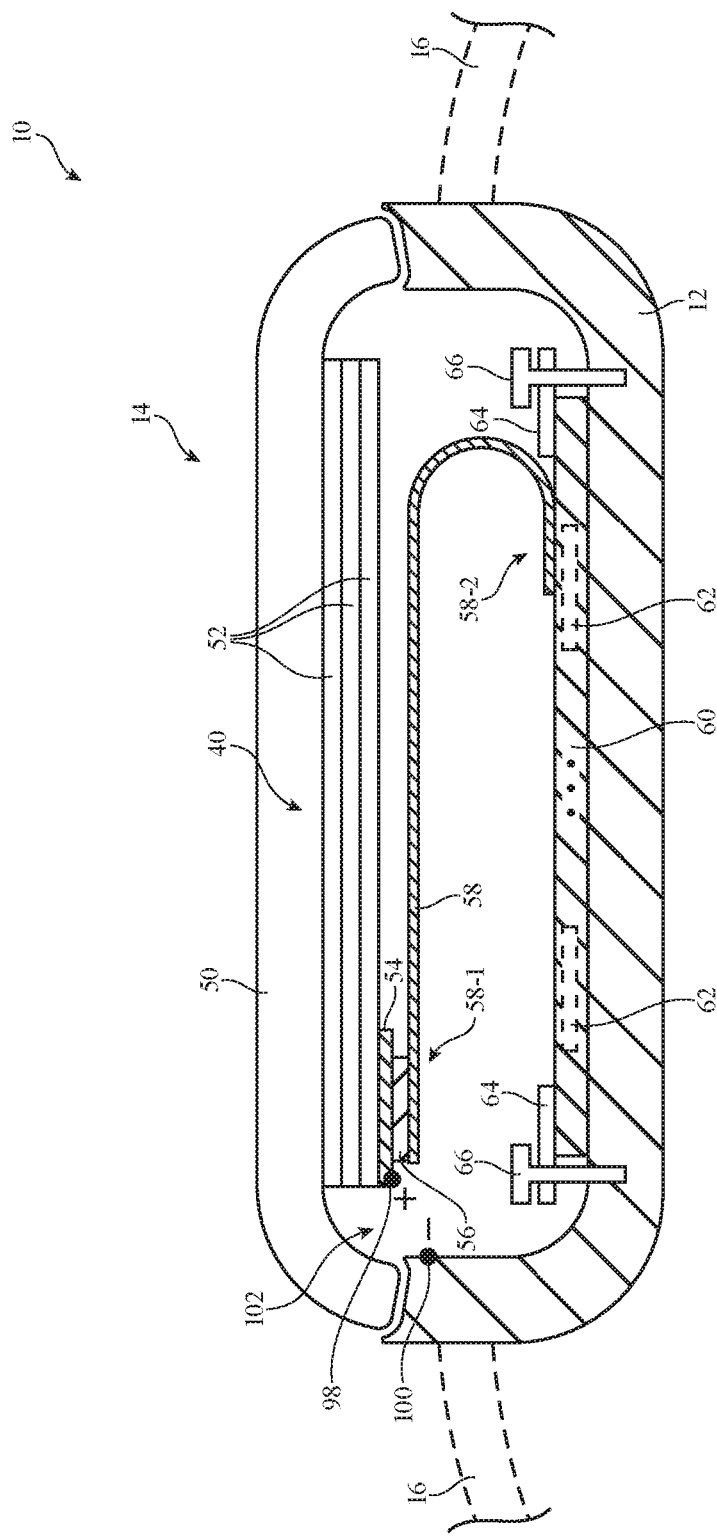
FIG. 2 is a cross-sectional side view of an illustrative electronic device in accordance with an embodiment.

A cross-sectional side view of an illustrative electronic device such as device 10 of FIG. 1 is shown in FIG. 2. As shown in FIG. 2, device 10 may have opposing front and rear faces. Device 10 includes a display such as display 14 that is mounted on the front face of device 10 in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls or sidewalls formed from other materials. Housing 12 may have a metal rear wall that extends over the rear face of device 10. The rear wall may be formed from metal or may include metal portions, plastic portions, glass portions, and/or portions formed from other materials (as examples). These materials may also be used in forming some or all of the sidewalls for housing 12.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as display cover layer 50. Display cover layer 50 may be formed from a transparent material such as glass, plastic, sapphire or other crystalline dielectric materials, ceramic, or other clear dielectric materials.

Device 10 may, if desired, be coupled to a strap such as strap 16. Strap 16 may be used to hold device 10 against a user's wrist (as an example). Configurations that do not include straps may also be used for device 10.

Display cover layer 50 may overlap components in device 10 such as electrical component layers 52. Layers 52 may include, for example, a capacitive touch sensor electrode array formed on a flexible substrate or other substrate that forms a two-dimensional touch sensor for display 14, a pixel array (e.g., a display layer) formed form a flexible organic light-emitting diode layer and/or other types of pixel arrays (liquid crystal display layers, micro-light-emitting diode arrays, etc.), a near-field communications antenna (e.g., a loop antenna formed from a number of concentric loops in a flexible printed circuit), and/or layers forming other electrical components.

Layers 52 may be formed from thin flexible substrates such as polymer substrates and may be laminated to each other and to cover layer 50 using adhesive (as an example). Electrical components such as printed circuit 54 and integrated circuits 56 (e.g., circuitry for controlling the circuitry of layers 52) may be mounted to layers 52 adjacent to the wall of housing 12. Flexible printed circuit 58 may be used for carrying signals between layers 52 (and circuitry 56) and control circuitry in device 10 such as system-in-package device 60. Device 60 may include one or more integrated circuit dies 62 and may have multiple dielectric layers with interposed patterned metal traces for carrying signals between dies 62. The patterned metal traces may form grounding solder pads (sometimes referred to as terminals or contacts) on the surface of device 60 and may include at least one ground plane layer that forms a ground for device 60. Metal brackets 64 may be coupled to the grounding solder pads in device 60 (e.g., using solder to solder at least some of brackets 64 to the solder pads on device 60) and may be coupled by screws 66 to housing 12 (e.g., a metal housing). Flexible printed circuit 58 may carry touch signals for the touch sensor in layers 52, image data for the display layer in layers 52, and near-field communications signals for the near-field communications antenna in device 10.

Layers 52 and flexible printed circuit 58 may form antenna 40 (e.g., a monopole antenna with an end that is coupled to ground via printed circuit 58) that covers cellular telephone bands, a satellite navigation system band (e.g., a GPS band), and other communications bands.

Antenna 40 may be fed using antenna feed 102. Antenna feed 102 may have a ground feed terminal such as terminal 100 that is coupled to housing 12. Housing 12 may be formed from metal and may serve as ground (e.g., a housing ground that serves as antenna ground for antenna 40). Antenna feed 102 may also have a positive feed terminal such as terminal 98. Feed terminal 98 may be coupled to printed circuit 52, circuits 56, and layers 52 and may be coupled to flexible printed circuit 58 through a connection between circuit 58 and circuits 52 and 56 at end 58-1 of printed circuit 58. End 58-2 of printed circuit 58 may be coupled to system-in-package device 60 (e.g., to ground the tip of monopole antenna 40).

Figure 3:
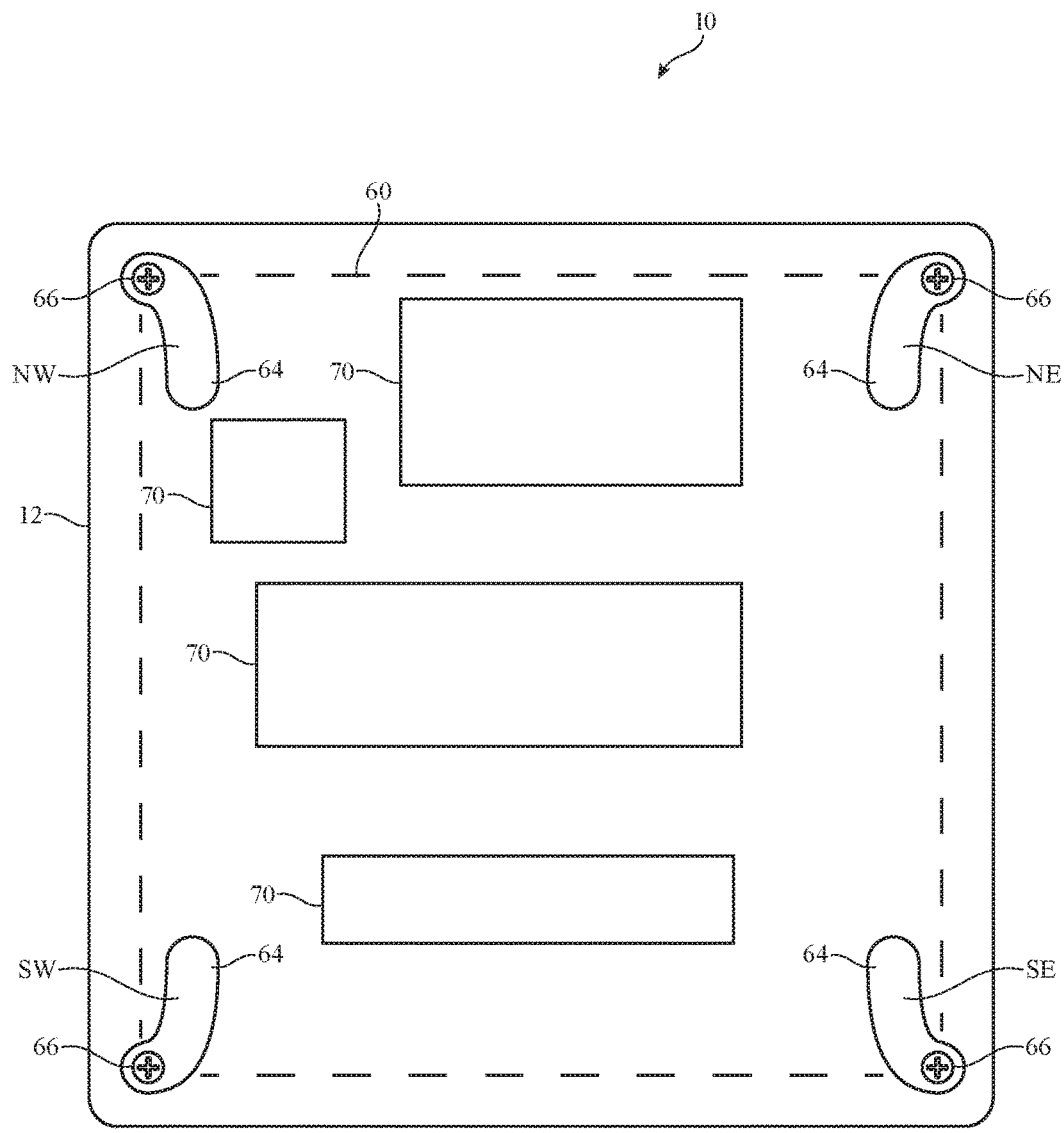
FIG. 3 is a top interior view of an illustrative electronic device in accordance with an embodiment.

Antenna performance (e.g., performance at satellite navigation system frequencies such as GPS frequencies) can be enhanced by creating direct-current (DC) electrical isolation in the bracket path associated with a least one of brackets 64. This electrical isolation may form an open circuit between the ground plane trace in device 60 and the ground formed from housing 12. The electrical isolation may, for example, have an associated capacitance of 7 pF, 2-20 pF, 1-25 pF, more than 1 pF, less than 30 pF, or other suitable capacitance. As shown in the interior top view of device 10 of FIG. 3, device 10 may include device 60 and overlapping components 70. Brackets 64 may be coupled to device 60 (e.g., using solder or other attachment mechanisms) and may be coupled to housing 12 using screws 66.

The solder pads under brackets 64 in device 60 may be coupled to ground in device 60 (e.g., a ground plane formed from patterned metal traces in one or more of the layers of device 60). Some of brackets 64 such as brackets NW, NE, and SW may be shorted to housing 12 and to an associated grounding solder pad in device 60. To enhance GPS antenna performance for antenna 40, at least one of brackets 64 such as bracket SE may be DC isolated from the ground formed from metal housing 12 by dielectric structures that are interposed into the path between housing 12 and the solder pad on device 60.

If desired, bracket SE may be isolated from metal housing 12 (so that an open circuit in the bracket path is formed between metal housing 12 and the ground plane in device 60) by overmolding a dielectric such as plastic onto at least some of the metal portion of bracket SE. The plastic may be used to create electrical isolation (DC isolation) and an appropriate capacitance between bracket SE and device 60 when device 60 is mounted in housing 12.

Figure 4:
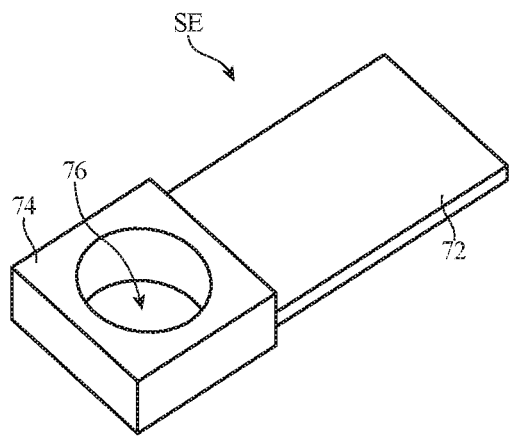
FIG. 4 is a perspective view of an illustrative insulated bracket for coupling a system-in-package device to an electronic device housing in accordance with an embodiment.
Figure 5:
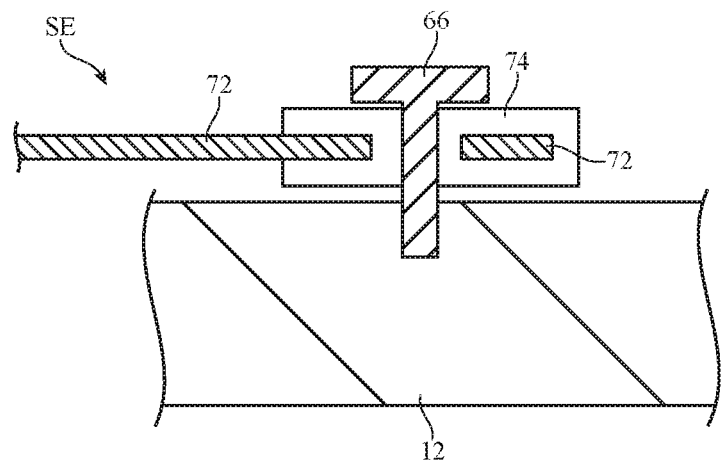
FIG. 5 is a cross-sectional side view of the illustrative bracket of FIG. 4 mounted between a system-in-package device and an electronic device housing in accordance with an embodiment.

FIG. 4 is a perspective view of bracket SE in an illustrative configuration in which bracket SE has a metal bracket member such as member 72 with a screw hole such as hole 76 to receive screw 66. Plastic 74 may form an electrically insulating coating over the end of member 72 that includes hole 76 while leaving the opposing end of bracket member 72 uncovered by plastic. The uncovered end of member 72 may be soldered to a grounding solder pad on device 60 and the end of member 72 with the dielectric isolation layer formed from plastic 74 may be attached to housing 12 using screw 66, as shown in FIG. 5.

Figure 6:
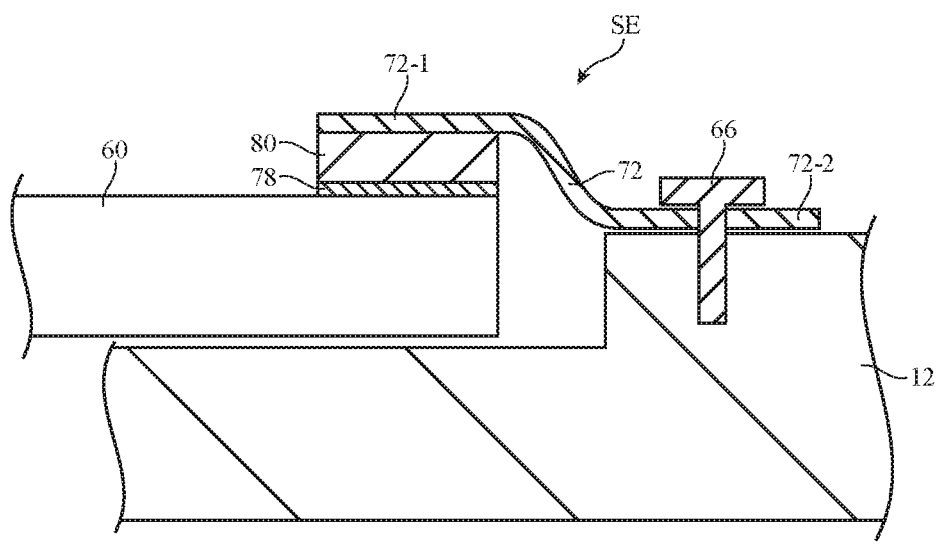
FIG. 6 is a cross-sectional side view of an illustrative bracket mounting configuration with an insulating adhesive layer in accordance with an embodiment.

In the illustrative configuration of FIG. 6, end 72-2 of bracket member 72 of bracket SE has been connected to ground by using screw 66 to press end 72-2 against metal housing 12. End 72-1 of bracket member 72 has been DC isolated (with an appropriate coupling capacitance of 1-25 pF or other suitable amount) from grounding solder pad (contact) 78 on device 60 by an interposed dielectric layer such as layer 80. Layer 80 may be, for example, a layer of dielectric adhesive (e.g., non-conductive polymer adhesive). If desired, polymer washers (e.g., ring-shaped washers or other gaskets) may be interposed between screw 66 and end 72-2 and between end 72-2 and housing 12 to create DC isolation between device 60 and housing 12 with an appropriate associated capacitance. Within device 60, grounding solder pads 78 that are associated with brackets NW, NE, and SW may be shorted to a ground trace (sometimes referred to as a ground plane) that grounds pads 78. The grounding solder pad that is associated with bracket SE may be isolated from the ground trace in device 60 (e.g., by disconnecting the metal traces between the ground trace and the grounding solder pad in device 60) or may be shorted to the ground trace in device 60. Whether shorted to the ground plane in device 60 or isolated from the ground plane in device 60, the presence of the interposed plastic washers or plastic bracket coating structures creates an open circuit between the grounding solder pad associated with bracket SE and housing 12 and therefore creates an open circuit between the ground trace in device 60 and housing 12 at bracket SE.

Using arrangements such as these and/or other arrangements, bracket SE can be prevented from shorting the ground plane of device 60 and the pad 78 that is associated with bracket SE to housing 12 through bracket SE (e.g., the pad 78 at bracket SE will be electrically isolated from housing 12 due to the presence of dielectric interposed in the conductive path formed through bracket SE between housing 12 and that pad 78). Other brackets such as brackets NE, SW, and NW may have no dielectric interposed between their bracket members and associated grounding solder pads 78 or housing 12 (or screws 66) and therefore form direct grounding paths between those grounding solder pads 78 (and the ground plane of device 60) and the ground formed by housing 12.

Figure 7:
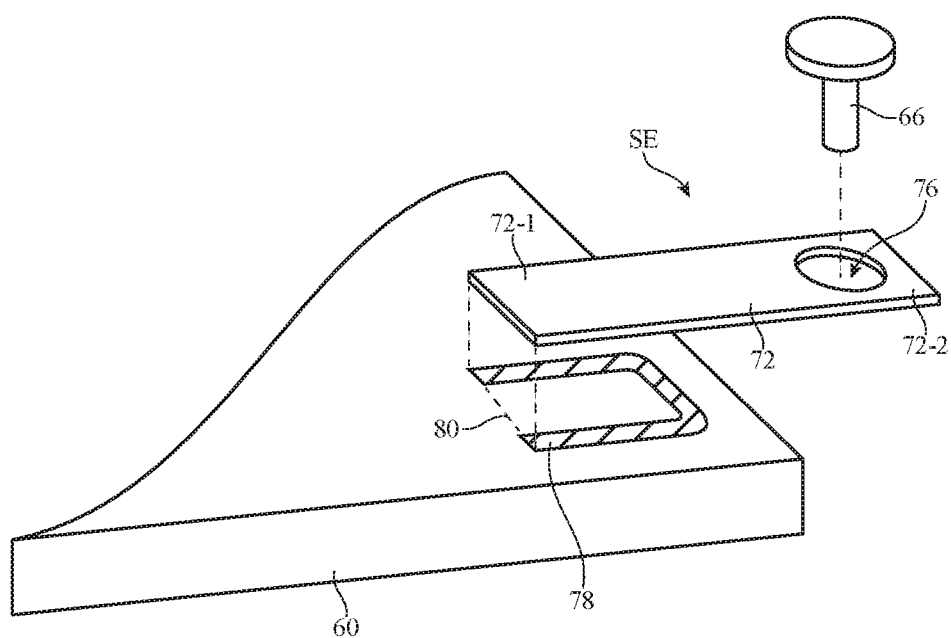
FIG. 7 is an exploded perspective view of an illustrative mounting bracket and associated solder pad on a system-in-package in accordance with an embodiment.

In the illustrative configuration of FIG. 7, solder pad 78 for bracket SE has a shape that limits the amount of overlap area between bracket member end 72-1 and pad 78. This may help reduce capacitive coupling between bracket member 72 and the ground formed by ground traces in device 60. The maximum overlap between the solder pad and bracket SE in FIG. 7 is given by rectangular footprint 80. Solder pad 78 has a reduced size relative to the rectangular footprint occupied by footprint 80. The illustrative layout for solder pad 78 of FIG. 7 has a horseshoe shape with a metal trace that surrounds a central opening, but other shapes that reduce overlap between member 72 and pad 78 relative to rectangular pad footprint (outline) 80 may be used, if desired.

Figure 8:
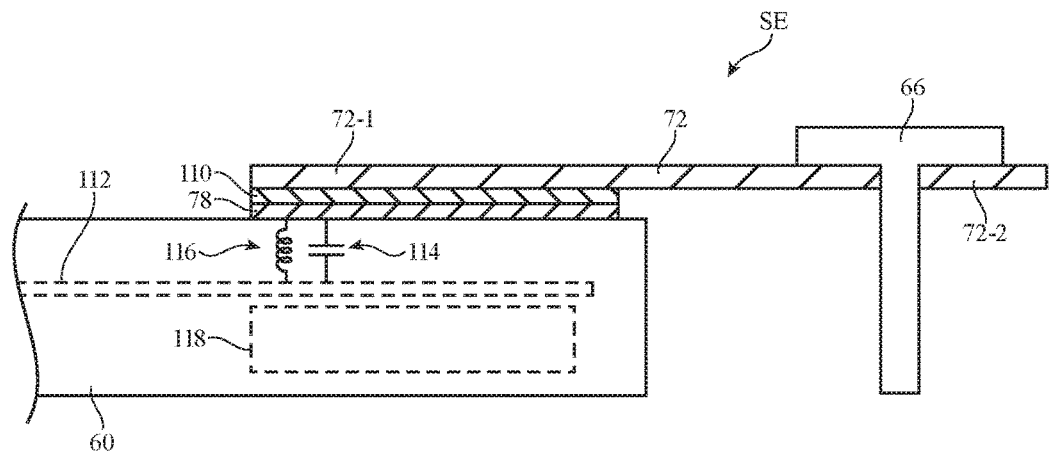
FIG. 8 is a cross-sectional side view of an illustrative bracket mounted to a solder pad of the type shown in FIG. 7 in accordance with an embodiment.

FIG. 8 is a cross-sectional side view of a bracket such as bracket SE of FIG. 7 that has been soldered to pad 78 on device 60. As shown in FIG. 8, end 72-2 of member 72 of bracket SE may have an opening to receive screw 66 (e.g., to attach member 72 to housing 12). At end 72-1 of member 72, solder 110 may be used to attach member 72 to pad 78 on device 60. Pad 78 may have a horseshoe shape or other suitable shape. The open space in the center of the horseshoe may overlap ground trace 112 in device 60. A tank circuit formed from inductor 116 and capacitor 114 or other circuits may be formed between pad 78 and ground 112, if desired. Capacitor 114 and inductor 116 may be formed from discrete components (e.g., packaged components embedded in device 60 and/or soldered to device 60) and/or may be formed from overlapping metal traces and/or other metal traces in device 60. The values of inductor 116 and capacitor 114 may be adjusted to enhance the performance of antenna 40 (e.g., to enhance the reception of GPS signals with antenna 40). Capacitor 114 may have a capacitance of 1-25 pF, more than 2 pF, less than 20 pF, or other suitable amount). Inductor 116 may have an inductance of 10 pH to 100 nH, more than 100 pH, less than 50 nH, or other suitable amount. With this type of arrangement, bracket member 72 is shorted to grounding pad 78, but grounding pad 78 is coupled to ground trace 112 by the tank circuit formed from inductor 116 and capacitor 114 rather than being shorted directly to ground trace 112 as with the grounding pads 78 at the other corners of device 60.

Figure 9:
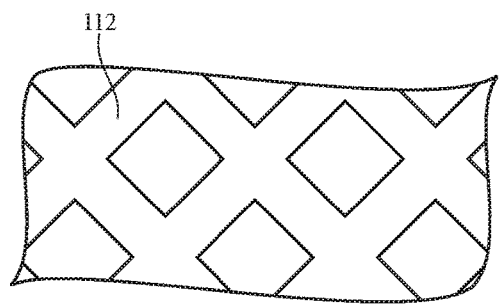
FIG. 9 is a top view of an illustrative grounding plane mesh of the type that may be incorporated into a metal ground plane trace under the grounding solder pad of the system-in-package device of FIGS. 7 and 8 in accordance with an embodiment.

Ground trace 112 may overlap underlying circuitry in device 60 such as circuitry 118. To reduce the overlap between member 72 and ground 112 (e.g., to adjust a contribution to the capacitance between member 72 and ground 112 that may arise from this overlap), ground 112 may have a mesh shape (e.g., the metal traces that form ground 112 may have the shape of a grid or other pattern with openings), as shown in FIG. 9. If desired, the capacitance associated with capacitor 114 of FIG. 9 may be formed solely from the overlap between pad 72 and ground 112.

Figure 10:
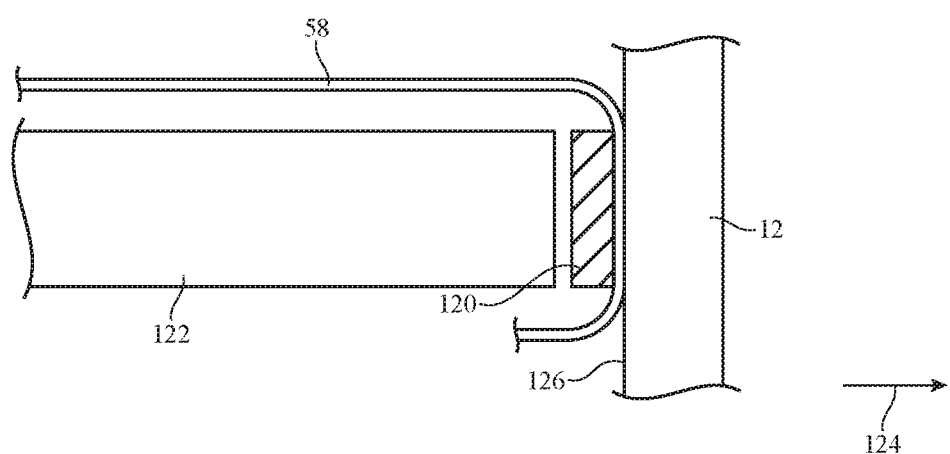
FIG. 10 is a cross-sectional side view of an illustrative stiffener that may be used to bias a flexible printed circuit towards ground structures such as metal electronic device housing wall in accordance with an embodiment.

FIG. 10 shows how a shim or other support structure such as support structure 120 may be used to press flexible printed circuit 58 outwards in direction 124 away from internal components such as battery 112 in the interior of housing 12. This may cause flexible printed circuit 58 to rest directly against housing 12 (e.g., device 10 may be free of intervening shims and other support structures between flexible printed circuit 58 and inner housing surface 126). This may enhance the performance of antenna 40 (e.g., the ability of antenna 40 to receive GPS signals may be enhanced by causing antenna currents to at least partly flow within the portion of housing 12 adjacent to surface 126). The wall of housing 12 and surface 126 adjacent to flexible printed circuit 58 may have any suitable shape (vertical, diagonal, curved, straight, etc.). The configuration of FIG. 10 is merely illustrative.

The foregoing is merely illustrative and various modifications can be made to the described embodiments. The foregoing embodiments may be implemented individually or in any combination.

What is claimed is:

1. An electronic device having front and rear faces, comprising:
    a metal housing;
    a display cover layer coupled to the metal housing on the front face;
    at least one electrical component layer adjacent to the display cover layer;
    a system-in-package device having at least first and second grounding solder pads; and
    a plurality of metal brackets including:
        a first bracket that is coupled between the first grounding solder pad and the metal housing and that forms a grounding path between the first grounding solder pad and the housing; and
        a second bracket that is coupled between the second grounding solder pad and the metal housing without forming a grounding path between the second grounding solder pad and the housing.

2. The electronic device defined in claim 1 further comprising:
    a flexible printed circuit that extends between the at least one electrical component layer and the system-in-package device.

3. The electronic device defined in claim 2 further comprising:
    an antenna feed having a ground antenna feed terminal coupled to the metal housing and a positive antenna feed terminal coupled to the at least one electrical component layer.

4. The electronic device defined in claim 3, wherein the at least one electrical component layer forms at least part of an antenna resonating element for an antenna and the metal housing forms at least part of a ground for the antenna.

5. The electronic device defined in claim 4 further comprising a satellite navigation system receiver coupled to the antenna feed.

6. The electronic device defined in claim 5 wherein the second bracket comprises:
a metal member with first and second opposing ends; and
a plastic coating at the second end.

7. The electronic device defined in claim 6 wherein the second end includes a screw hole and the plastic coating electrically isolates the metal member from the metal housing.

8. The electronic device defined in claim 7 further comprising:
a screw that is received within the screw hole, that attaches the second end to the metal housing, and that is electrically isolated from the second end by the plastic coating.

9. The electronic device defined in claim 8 wherein the plastic coating creates a capacitance between the metal housing and the second grounding solder pad of 1 to 25 pF.

10. The electronic device defined in claim 9 wherein the at least one electrical component layer comprises a display layer, a touch sensor layer, and a near-field communications antenna layer.

11. An electronic device, comprising:
a metal housing;
a display cover layer coupled to the housing;
at least one electrical component layer adjacent to the display cover layer;
a system-in-package device having at least first and second grounding solder pads and having a ground plane formed from a metal trace that is shorted to the first grounding solder pad and that is coupled to the second grounding pad by a tank circuit; and
a plurality of metal brackets including:
a first bracket that is coupled between the first grounding solder pad and the metal housing; and
a second bracket that is coupled between the second grounding solder pad and the metal housing.

12. The electronic device defined in claim 11 further comprising an antenna feed having a ground antenna feed terminal coupled to the metal housing and a positive antenna feed terminal coupled to the at least one electrical component layer.

13. The electronic device defined in claim 12 wherein the at least one electrical component layer comprises a display layer and a touch sensor layer.

14. The electronic device defined in claim 13, wherein the at least one electrical component layer forms at least part of an antenna resonating element for an antenna.

15. The electronic device defined in claim 14 wherein the at least one electrical component layer further comprises a near-field communications antenna layer.

16. The electronic device defined in claim 15 wherein at least a portion of the metal trace forms a ground plane mesh with openings.

17. The electronic device defined in claim 16 further comprising:
a flexible printed circuit that extends between the at least one electrical component layer and the system-in-package device; and
a satellite navigation system receiver coupled to the antenna feed.

18. The electronic device defined in claim 11 wherein the second grounding solder pad has a horseshoe shape with a central opening and wherein the metal trace has a mesh portion under the central opening.

19. An electronic device, comprising:
a metal housing;
electrical component layers including a touch sensor layer, a display layer, and a near-field communications antenna layer;
a system-in-package device having at least first and second grounding solder pads and having a ground plane formed from a metal trace that is shorted to the first grounding solder pad and that is shorted to the second grounding solder pad;
an antenna feed for an antenna, the antenna feed having a ground antenna feed terminal coupled to the metal housing and a positive antenna feed terminal coupled to the electrical component layers, wherein the electrical component layers form a resonating element for the antenna;
a plurality of metal brackets including:
a first bracket that is coupled between the first grounding solder pad and the metal housing and that forms a grounding path between the first grounding solder pad and the metal housing; and
a second bracket that is coupled between the second grounding solder pad and the metal housing without forming a short circuit through the second bracket between the second grounding solder pad and the metal housing.

20. The electronic device defined in claim 19 further comprising:
a flexible printed circuit that extends between the positive antenna feed and the system-in-package device; and
a plastic support structure that biases the flexible printed circuit against at least part of the metal housing.

* * * * *